United States Patent Office 3,636,024
Patented Jan. 18, 1972

---

3,636,024
HALOGENATED-10,10'-BIPHENOXARSINES
Chun-Shan Wang and Thomas W. McGee, Midland, Mich., assignors to The Dow Chemical Company, Midland, Mich.
No Drawing. Filed May 4, 1970, Ser. No. 34,615
Int. Cl. C07f 9/74; A01n 9/00; C08f 1/84
U.S. Cl. 260—440                    4 Claims

ABSTRACT OF THE DISCLOSURE

The present invention is directed to methods useful for protecting articles from attack by marine-fouling organisms which comprises treating an article with compositions containing an anti-fouling amount of an organoarsine compound corresponding to the formula

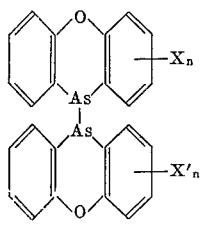

wherein X and X' represent halogen, and $n$ is 0, 1 or 2, and thereafter placing the article so treated in the environment of the marine-fouling organisms. Methods of treating articles by painting their surfaces with a paint composition containing at least 0.2 pound of one of the above organoarsine compounds per gallon of composition are described together with useful paint compositions. The halogenated organoarsine compounds of the above formula wherein $n$ is 1 or 2 are novel compounds and constitute a second embodiment of this invention.

BACKGROUND OF THE INVENTION

Marine organisms, particularly the organisms commonly referred to as marine foulants, cause extensive damage to pilings, wharves, sea walls, ship hulls, cables, docks and the like which remain in sea water for even short periods of time. With wood, the organisms in a majority of cases actually destroy the article. In other cases, particularly in the case of seagoing vessels having hulls of metal or synthetic materials such as glass-reinforced polyester, severe problems result from the mere attachment of marine-fouling organisms to the vessel. Although the organisms do not feed on, or burrow into or otherwise physically destroy the hulls of such seagoing vessels, they do attach themselves to the submersed surfaces, increasing the weight of the vessel, fouling the submersed working parts such as rudders, and seriously increasing the hydrodynamic resistance to the motion of such vessels through the sea. Therefore, it is desirable to devise a method which will protect these various materials from the attack of the marine-fouling organisms such as bryozoans, bugula, hydroids, mollusks, tube worms and tunicates.

Heretofore, materials placed in the marine environment have often been protected by the use of anti-fouling paint containing, as active agents, copper or mercuric inorganic compounds. However, these anti-fouling substances are used in most cases in the form of compounds which are known to react with various components in the paint or with water-soluble sulfides often encountered in polluted waters and thereby become ineffective. See U.S. Pat. No. 3,214,281. Furthermore, such inorganic compounds usually have a high specific gravity so that the active compounds settle when the paint is stored and must be completely resuspended before the paint can be employed. More recently, ships have been built of light alloys containing, as an essential ingredient, aluminum or magnesium. Anti-fouling paints containing inorganic copper and mercury compounds attack and corrode such alloys electrochemically making such paints undesirable. Furthermore, anti-fouling paints containing the mercury or copper compounds are limited to dark color tones and the bright colors often desired for decorative coatings cannot be employed.

DESCRIPTION OF THE PRIOR ART

Anti-fouling methods utilizing certain non-anticipatory organoarsine compounds are known in the art and are set forth in U.S. Pat. No. 3,214,281, issued Oct. 26, 1965, to Masao Nagasawa. The unsubstituted 10,10'-biphenoxarsine compound is described in the art by W. L. Lewis, J. Am. Chem. Soc., 43:891 (1921); no known utility has been attributed to 10,10'-biphenoxarsine.

SUMMARY OF THE INVENTION

In accordance with the present invention, it has been discovered that organoarsine compounds represented by the following structural formula:

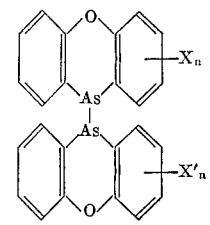

wherein X and X' represent halogen and $n$ is 0, 1 or 2, are useful in methods for protecting articles from attack by marine-fouling organisms when such articles are treated with compositions containing an anti-fouling amount of one of the compounds of the present invention. Novel compounds of the above formula, wherein $n$ is 1 or 2, have also been discovered and thus form a second embodiment of the present invention.

The compounds disclosed as operable in the methods of the present invention are normally yellow crystalline solids at room temperatures which are moderately soluble in various organic solvents and of low solubility in water. The term "halogen" is employed herein to represent chlorine, bromine and iodine. The term "marine-fouling organism" is employed herein to designate one or more species of organisms commonly referred to as "marine-foulants" and is understood to include one or more of the barnacles (Cirripediae) such as *Balanus improisus*, *B. amphitrite*, *B. eburneus* and *B. trigonus*, encrusting bryozoans (Bryozoae), Begulae, hydroids (Hydroidae), mollusks (Molluscae), tube worms (Annelidae) and tunicates (Tunicatae). These organisms occur widely throughout the world and their "marine environment" or "marine habitat," as referred to in the present specification and claims, includes the oceans, seas, bays, gulfs, harbors, river mouths and the like in which the environment is subject to change due to tidal motion and currents and wherein the salinity of the water varies from that of the high seas to merely distinctly brackish.

Ordinarily, in practicing the methods of the present invention, the article to be protected from the marine-fouling organisms is treated rather than the organisms and their marine environments. Since the marine habitat of the organisms is of immense proportions and is subject to various changing environmental conditions, the treatment of the organisms and their habitats is ordinarily rendered impractical. It is also desirable to protect organisms inhabiting the marine environment as many of these organisms, such as certain mollusks, are of economic importance in some marine environments while others, directly or indirectly, contribute to the food supply of various other economically significant organisms. Furthermore, many of the articles which may be protected by the methods of the present invention are movable marine structures such as ships, boats, hydrofoils and various like watercraft. Movement of these structures from one location to another exposes the submerged portions of these structures to changing marine environments; it is therefore both practicable and desirable to treat the submerged portions of these marine structures themselves in order to obtain the desired protection from marine-fouling organisms. Other articles, such as semi-movable or immovable marine structures, including buoys, channel-markers, cables, wharves, pilings, docks, and the like may be similarly protected from marine-fouling organisms by treating the submerged portions of such articles, including those portions submerged during high tide, thereby avoiding the above-mentioned deleterious efforts to the organisms in the surrounding marine environment.

Thus, for the practice of the present invention in controlling marine-fouling organisms, it is essential and critical that the article to be protected, and not the marine environment itself, be treated with an anti-fouling amount of a 10,10'-biphenoxarsine compound. Normally, the article to be protected is first treated with an anti-fouling amount of a 10,10'-biphenoxarsine compound, generally while the article is on land or otherwise removed from the sea. After the treating step, the aforementioned articles are then exposed to the environment of the marine-fouling organisms. What constitutes an anti-fouling amount of the organoarsine compound will vary according to the length of time that such protection is desired, the method of treating employed, the particular 10,10'-biphenoxarsine compound employed, the material being treated and the numbers and types of marine-fouling organisms inhabiting the particular aquatic environment or environments into which the protected article is to be placed.

The articles to be protected according to the present methods can comprise one or more of a variety of substrates which are subject to encrustation by certain marine-fouling organisms and to destruction by other marine organisms. Porous articles, such as wood, for example, are not only fouled by barnacles, tube worms, hydroids and the like, but are also weakened or destroyed by marine organisms of the genus Limnoria. Non-porous articles are generally resistant to destruction by marine-fouling organisms, but are subject to fouling encrustation by such organisms. Examples of such non-porous substrates include metals, such as iron, steel, magnesium, aluminum and the like and alloys thereof; glass materials and glass-reinforced polyester materials such as Fiberglas; and synthetic plastic materials.

Treatment of the above-mentioned articles with anti-fouling amounts of the particular 10,10'-biphenoxarsine compound to be employed may be accomplished in a variety of ways. The porous materials are ordinarily treated by impregnation techniques wherein the anti-fouling compound is distributed throughout the article substrate, with the anti-fouling amount being conveniently expressed in terms of weight of anti-fouling compound per unit volume of substrate. Generally, excellent anti-fouling results are obtained by this method when the article is treated to contain from about 3.0 to about 35.0 milligrams of the anti-fouling compound per cubic centimeter of substrate. The aforementioned non-porous articles, as well as the porous articles, may be treated by applying the compound itself or by applying coating compositions, such as paints and the like, containing an anti-fouling amount of the 10,10'-biphenoxarsine compound employed to a surface of the article to be exposed. Conventional coating techniques such as spraying, dipping, rolling or brushing may be utilized. Here, the anti-fouling amount of the 10,10'-biphenoxarsine compound employed can be expressed by weight of anti-fouling compound per unit of surface area. In the case of surface coatings, such as paints, it is especially convenient to express the anti-fouling amount of the compound in terms of concentration in the treating composition, in units such as percent by weight or volume or in unit weight of 10,10' - biphenoxarseine compound per unit volume of treating composition. It is understood that such compositions, when employed for surface treatment of articles by methods well known to those skilled in the art, are adapted to apply a predetermined volume or weight of treating composition per unit area of the article surface. From these values the actual weight of 10,10'-biphenoxarsin compound per unit of article surface area readily can be determined. In general, excellent protection can be obtained by coating the article with a composition delivering from about 0.2 to about 4.0 or more milligrams of the anti-fouling compound per square centimeter of exposed article surface.

The present compounds are particularly effective in preventing the attack of anti-fouling organisms when employed in paints, and such compositions are preferred when treating non-porous articles. These can be paints that, after application, become a firm and hard substance such as paints based upoin thermo-plastic resins in combination with plasticizers and other resin modifiers such as rosin to control leaching rate or induce controlled erosion in use. The paint compositions can be prepared by known techniques for the preparation of the particular type of paint such as latex paints, epoxy ester paints and vinyl resin paints. One or more coats of the paint composition can be applied directly to the article or to a coating of a conventional primer previously applied to the article. In general, the article surface should be treated with sufficient amounts of the paint composition to provide at least 0.2 milligram of anti-fouling 10,10'-biphenoxarsine compound per square centimeter of surface.

Exceptional control of marine-fouling organisms can be obtained when the anti-fouling compound is incorporated in a vinyl resin paint and the vinyl resin paint is employed to treat articles which are to be exposed to marine-fouling animals. The term "vinyl resin paint" is employed herein to refer to paint compositions employing a binder which comprises a vinyl polymer resin and is intended to include polyvinyl chlorides, polyvinyl alcohols, polyvinyl acetates and mixtures and copolymers, terpolymers and interpolymers thereof such as polyvinyl chloride-polyvinyl acetate copolymers and polyvinyl chloride polyvinyl acetate-polyvinyl alcohol terpolymers and the like. Vinyl resin paints including an anti-fouling amount of a 10,10'-biphenoxarsine compound can be formulated in a variety of colors and can be applied easily. The preferred vinyl resin paint compositions contain the vinyl polymer resin binder, rosin, a pigment, an anti-fouling amount of a 10,10'-biphenoxarsine compound and an organic solvent. Generally, the solvent is a mixture of organic solvents, including one or more of an alkylbenzene such as toluene or a xylene; a short chain aliphatic alcohol such as methanol, ethanol or isopropanol; a ketone, usually containing from 4 to 7 carbon atoms and an alkylene glycol alkyl ether wherein the alkylene and alkyl groups contain 2 or 3 carbon atoms or an ester thereof. The paint compositions are conveniently prepared by conventional procedures such as intimately dispersing the anti-fouling 10,10'-biphenoxarsine compound and the solid components such as pigments, extenders, suspending agents and the like in a portion of the solvent and then intimately mixing the resulting dispersion with an intimate mixture of the vinyl polymer resin, the rosin and the remaining solvent. These compositions dry rapidly to provide a tough film which gives long-lasting protection from attack by marine-fouling organisms.

The paint compositions generally contain a 10,10'-biphenoxarsine compound in the form of small particles, from about 10 to about 50 or 60, to about 100 microns in diameter. Best results are obtained with a particle size from about 10 to about 20 microns in diameter. Good results can be obtained when the anti-foulant compound is incorporated in the paint in amounts from about 0.2 to about 1.3, to about 1.7 to 2.0 or as high as about 2.5 to 3 pounds of anti-foulant compound per gallon of paint. The application of a single coat of such a paint composition to an article surface provides from about 0.2 to about 4.0 milligrams of the 10,10'-biphenoxarsine compound per square centimeter of surface. Additional coats of paint will supply higher concentrations of the 10,10'-biphenoxarsine compound on the treated surface and in the preferred procedure, at least two coats of paint composition are applied.

In the preferred procedure, the paint employed to treat articles is a vinyl resin paint containing from about 0.5 to about 3.0 pounds of a 10,10'-biphenoxarsine compound per gallon.

The following examples illustrate the methods of the present invention but are not to be construed as limiting.

Example 1

A series of porous silica panels, 63 millimeters square by 5 millimeters, are treated with 10,10'-biphenoxarsine by impregnating the panels with the active compound as taught by Miller, I. & E. C. Product Research and Development, vol. 3, September 1964, pp. 226–230. Each panel was impregnated with about 0.124 gram of 10,10'-biphenoxarsine, or about 6.2 milligrams of the anti-fouling compound per cubic centimeter of substrate. A separate series of similar silica panels of the same size are similarly prepared but are not treated with any anti-fouling compound. Both series of panels are completely immersed in Biscayne Bay in Miami, Fla. The panels are allowed to remain immersed from January to March, a total of two months' time. At that time, all panels are removed from the water and visually inspected to determine the amount of attack by marine-fouling organisms. The panels containing 0.124 gram of 10,10'-biphenoxarsine each are found to be completely free of barnacles, encrusting bryozoans, bugula, hydroids, oysters, tube worms and tunicates, whereas the untreated blank panels are found to be more than 50 percent fouled with forms of all of the organisms above named.

Example 2

Following the procedures in Example 1, a series of porous silica panels are impregnated with about 0.127 gram of 2,2'-dichloro-10,10'-biphenoxarsine, i.e., about 6.4 milligrams of the anti-fouling compound per cubic centimeter of substrate. These panels are found to be completely free of the marine-fouling organisms as recited in Example 1, whereas similarly exposed untreated panels used as a control are found to be more than 50 percent fouled with the organisms above named.

Example 3

Following the procedures in Example 1, a series of porous silica panels are impregnated with about 0.124 gram of 4,4'-dichloro-10,10'-biphenoxarsine, i.e. about 6.2 milligrams of the anti-fouling compound per cubic centimeter of substrate. These panels are found to be completely free of the marine-fouling organisms as recited in Example 1, whereas untreated blank panels after similar exposure are found to be more than 50 percent fouled with the organisms above named.

Example 4

Five wooden blocks, each measuring one-half inch by one inch by two inches, are treated with an anti-fouling amount of 10,10'-biphenoxarsine by conventional impregnation techniques. The blocks are impregnated with a solution containing five percent by weight of 10,10'-biphenoxarsine in a volatile organic solvent. A separate series of similar blocks are similarly treated with 2,2'-dichloro-10,10'-biphenoxarsine. A third series of similar blocks are prepared as a check wherein the blocks are not treated with any phenoxarsine compound. All the blocks are placed in racks and immersed in sea water infested with marine-fouling organisms. After twelve months, the blocks are removed and examined. The check blocks are found to be heavily fouled with marine-fouling organisms while the blocks treated with 10,10'-biphenoxarsine and those treated with 2,2' - dichloro-10,10'-biphenoxarsine are found to be substantially free of marine-fouling organisms.

EXAMPLE 5

10,10'-bisphenoxarsine is incorporated in a vinyl resin paint composition and this composition is employed to treat steel panels. The paint has the following composition.

| Ingredient: | Pounds per 100 gallons |
|---|---|
| 10,10-biphenoxarsine | 94 |
| Polyvinyl chloride-polyvinyl acetate-polyvinyl alcohol terpolymer | 98 |
| Rosin | 62 |
| Tricresylphosphate | 10 |
| Iron oxide, red pigment | 100 |
| Bentonite | 4 |
| Methanol | 1 |
| Methyl isobutyl ketone | 288 |
| Xylene | 189 |
| Ethylene glycol ethyl ether acetate | 23 |

Steel panels are treated with the anti-fouling paint composition by brushing the composition onto the panels and allowing the painted panels to dry and then applying a second coat. This treatment provides about 1.3–1.5 milligrams of anti-foulant per square centimeter of surface. The panels are placed in racks and immersed in sea water containing marine-fouling organisms for five months. At the end of the test period, the panels were removed and visually observed. The panels treated with the paint containing about 0.94 pound per gallon of 10,10'-biphenoxarsine were found to be substantially free of marine-fouling organisms. Similar panels which are not treated with an anti-fouling composition are immersed in sea water and are found to be heavily fouled with marine-fouling organisms within a few weeks to one or two months.

The second embodiment of the present invention is directed to novel 10,10'-biphenoxarsine compounds corresponding to the formula:

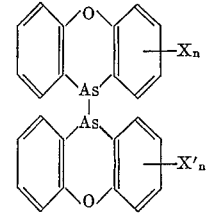

wherein X and X' are as set forth hereinbefore and $n$ is 1 or 2. These novel compounds have utility as described in the foregoing methods and examples.

These novel compounds are generally prepared by reducing a corresponding 10,10'-oxybis(halo)phenoxarsine reactant with an appropriate reducing agent, such as, for example, phosphorous acid, in the presence of an inert polar solvent. Representative 10,10'-oxybis(halo)phenoxarsine reactants operable in this process include: 10,10'-oxybis(2-chloro)phenoxarsine; 10,10' -, oxybis(4-chloro) phenoxarsine; 10,10'-oxybis(2,8 - dichloro)phenoxarsine, and the like. Suitable inert, polar solvents which provide sufficient solubility for the employed reactant include, for example, methanol, ethanol, acetone, dimethylsulfoxide, and the like. In carrying out the various reduction reactions to prepare the novel halogenated compounds of the present invention, the phosphorous acid reducing agent is employed in at least the equimolar proportions consumed in the particular reaction. The use of an excess, upwards from about a 50 percent molar excess to about a 10-fold molar excess, of the reducing agent is preferred.

In carrying out the actual preparation of the novel compounds, the phosphorous acid reducing agent is added in any convenient fashion, to a refluxing mixture of the 10,10'-oxybis(halo)phenoxarsine and solvent. The resulting reaction mass is maintained at gentle reflux under ambient pressure conditions for a period of time sufficient to assure substantial completion of the reaction, generally from about 3 to about 6 hours. Recovery of the corresponding halogenated 10,10'-biphenoxarsine crystalline product formed during the course of the reaction is achieved by employing conventional procedures such as, for example, filtration of the reaction mass. Typically, the reaction mass is filtered while hot and the separated crystalline product can be used directly for any number of application. If desired, the product can be further purified by conventional procedures, which include washing with an appropriate liquid which is a solvent for impurities but not for the product, recrystallization, and the like. The following examples further illustrate the practice of the present invention but are not meant to limit the invention thereto.

Example 6—2,2'-dichloro-10,10'-biphenoxarsine 8.7 grams (0.015 mole) of 10,10'-oxybis(2-chlorophenoxarsine) is dissolved in 150 milliliters of absolute ethanol with stirring and the resulting clear mixture is heated to reflux temperature under normal atmospheric pressure. Addition of 8 grams (0.126 mole) of crystalline phosphorous acid, in small portions, to the refluxing mixture causes the mixture to turn yellow. Continued refluxing of the reaction mass for a period of about one-half hour results in the formation of a crystalline precipitate. Refluxing of the reaction mass is continued for about three to about four more hours and the reaction mass is filtered while hot. The yellow crystals of the 2,2'-dichloro-10,10'-biphenoxarisine product thus obtained are successively washed with 300 milliliters of ethanol and water and dried overnight in a desiccator. The recovered product has a melting point of 176–178° C. and elemental analysis shows C, 51.1%; H, 2.54%; Cl, 12.40%; calculated analysis for 2,2' - dichloro-10,10'-biphenoxarsine (empirical formula $C_{24}H_{14}As_2Cl_2O_2$): C, 51.9%; H, 2.52%; Cl, 12.80%.

In substantially the same manner the following compounds of the present invention are prepared.

4,4' - dichloro-10,10'-biphenoxarsine (melting at 126–130°) by reacting 10,10'-oxybis(4-chlorophenoxarsine) and phosphorous acid.

2,2',8,8'-tetrachloro-10,10'-biphenoxarsine (melting at 262–265°) by reacting 10,10-oxybis(2,8-dichlorophenoxarsine) and phosphorous acid.

4,4',6,6'-tetrabromo - 10,10' - biphenoxarsine (Molecular weight 802) by reacting 10,10'-oxybis(4,6-dibromophenoxarsine) and phosphorus acid.

3,3'-diiodo - 10,10' - biphenoxarsine (Molecular weight 738) by reacting 10,10'-oxybis(3-iodophenoxarsine) and phosphorous acid.

What is claimed is:
1. Compounds corresponding to the formula:

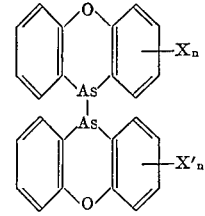

wherein X and X' are halogen and $n$ is 1 or 2.

2. The compound claimed in claim 1 which is 2,2'-dichloro-10,10'-biphenoxarsine.

3. The compound claimed in claim 1 which is 4,4'-dichloro-10,10'-biphenoxarsine.

4. The compound claimed in claim 1 which is 2,2',8,8'-tetrachloro-10,10'-biphenoxarsine.

References Cited
UNITED STATES PATENTS

| 2,701,812 | 2/1955  | Takahashi et al. | 260—440 |
| 2,767,114 | 10/1956 | Urbschat et al.  | 260—440 |
| 3,544,610 | 12/1970 | Wang et al.      | 260—440 |
| 3,547,967 | 12/1970 | Wang et al.      | 260—440 |

JAMES E. POER, Primary Examiner
W. F. BELLAMY, Assistant Examiner

U.S. Cl. X.R.
424—297; 260—41